INVENTOR:
BERNARD RIDER
BY Robert H. Henderson
ATTORNEY.

INVENTOR:
BERNARD RIDER
BY Robert H. Henderson
ATTORNEY.

Sept. 15, 1970 B. RIDER 3,529,081

MEANS FOR APPLYING ADDITIONAL COMMUNICATIONS SIGNALS TO EXISTING CHANNELS

Filed Jan. 11, 1967 3 Sheets-Sheet 3

INVENTOR:
BERNARD RIDER
BY Robert H. Henderson
ATTORNEY.

United States Patent Office 3,529,081 Patented Sept. 15, 1970

3,529,081

MEANS FOR APPLYING ADDITIONAL COMMUNICATIONS SIGNALS TO EXISTING CHANNELS

Bernard Rider, Bethesda, Md., assignor to The Western Union Telegraph Company, New York, N.Y., a corporation of New York Filed Jan. 11, 1967, Ser. No. 608,626
Int. Cl. H04n 7/04
U.S. Cl. 178—5.6 7 Claims

ABSTRACT OF THE DISCLOSURE

Means for modulating information having a high time rate of information transfer onto a television picture signal from the transmitting end of a television signal transmission channel, and for recovering said information at the receiving end of the signal transmission channel, by applying appropriate modulation to the television carrier wave so as to cause binary coded information to be present during the existing blanking pulses of the television wave.

This invention relates to novel means for applying further and additional communications signals of a specified character to existing and heavily loaded communications channels, and it relates more specifically to a novel means for modulating information having a high time rate of information transfer onto a television picture signal, this being done at the transmitting end of a conventional television signal transmission channel, and for recovering the said information having a high rate of information transfer at the receiving end of the signal transmission channel. This is accomplished, according to the disclosure hereinafter set forth in respect to a specific illustrative example of the present invention, by applying appropriate modulation to the television wave in order to cause binary coded information to be present in the existing blanking pulses of the television wave.

The field of the instant invention lies in the telecommunications art since it is of present value only in that field, and the preferred utility of the instant invention as presently contemplated embraces the point to point transmission of high speed digital data among which is the kind now widely used to address digital computers, either with prepared input data, or by communication carried on between a plurality of the computers themselves such as can readily occur with time sharing and on-line computer applications wherein the rapid transfer of digital data from the storage memory of one computer to that of another is required, particularly in business computer systems of wide geographical scope, where widely dispersed collections of financial, inventory, or other data must be transmitted to a central headquarters location.

In has been known in the prior art to transmit binary permutation code intelligence signals by such means as frequency shift keying, and a great deal of such traffic in the Baudot printing telegraph code is currently handled over radio channels by this means. The information transfer rate capability of such arrangements, however, is many orders of magnitude lower than the minimum requirements for the purposes aforementioned.

Television transmissions, on the other hand, occupy a six megahertz channel in spectrum regions involving hundreds of megahertz, both of which factors are conducive to their ability and in fact necessary to their requirement for the transmission of video and other information at a very rapid time rate.

It has been observed that due to a peculiar characteristic of the presently constituted standard form of television signal, the commodious information channel which it normally occupies remains substantially unused for brief but frequent although irregularly occurring periods during the transmission of the television signal, namely during the periods when the sole picture transmission comprises the video carrier at the constant amplitude which is definitive of the synchronizing pulses. These "pulses" in fact constitute rectangular or trapezoidal waves in their conventional representation in cartesian coordinates wherein $y=f(x)$; $y$ being a scalar representation of amplitude on the vertical axis, and $x$ being a scalar representation of time on the horizontal axis; having a duration of approximately five microseconds and a recurrence rate of approximately 16,000 per second. In the broadcast television signal, they constitute signals imposed by amplitude modulation on a constant picture carrier frequency.

It is contemplated by the present invention to provide appropriate means for modulating these repetitive synchronizing pulses with binary permutation code information bits of the kind suited for the transmission of alphanumeric guarded characters and function signals at an information rate adequate for computer intercommunication purposes, while at the same time conserving the bandwidth required of the information channel to the effect that it is not unduly extended beyond the presently officially allotted limits for such vestigial sideband transmission.

Although it will be apparent to those versed in the art that any one of a variety of different well known forms of modulation can be employed in order to impose the desired communication intelligence information upon the television transmission signals, it is presently preferred to apply them thereto by means of phase modulation of the picture carrier wave, where such wave is available for the purpose. The consequence of this procedure is to render the modulated video signal virtually indistinguishable from the unmodulated form, insofar as its more readily observed or measured aspects are apparent from their customary form of visual representation although the desired modulation signals can be readily and accurately extracted from the video waveform by a process of demodulation or detection in a manner hereafter to be described, and a minimum of alteration of the basic characteristics of that waveform thus is required in order to accomplish the desired transmission of digital intelligence signals at a high rate of speed. As a consequence of this latter circumstance it is found that the spectral bandwidth requirements for such composite video and communications signals can readily be held to a minimized value through the quasi suppression of one set of consequent signal sidebands, in the usual manner.

It is therefore an object of the present invention to provide means for transmitting and recovering digital information in a television channel which is simultaneously occupied with the transmission of a television signal.

It is a further object of the invention to accomplish the above object without substantial interference with the television image signal being transmitted.

A still further object is to provide means for invisibly imposing upon and recovering data signals from a video raster signal without substantial enlargement of the bandwidth requirements therefor.

Another object of the present invention is to enable inter-office and existing inter-city video paths to be utilized for the simultaneous dispatch of binary coded data signal and television picture information signals.

As will become apparent hereinafter, these and all other evident objects, as well as certain further advantages peculiar to the instant invention will be made clear by the following detailed description of a specific illustrative example of just one of the several forms in which the invention may be practiced; the form so chosen being that which is presently preferred.

From the description as aforesaid a clearer understanding of the invention may be had, when it is considered in conjunction with the appended drawings, wherein.

TRANSMITTER

Figure 1:
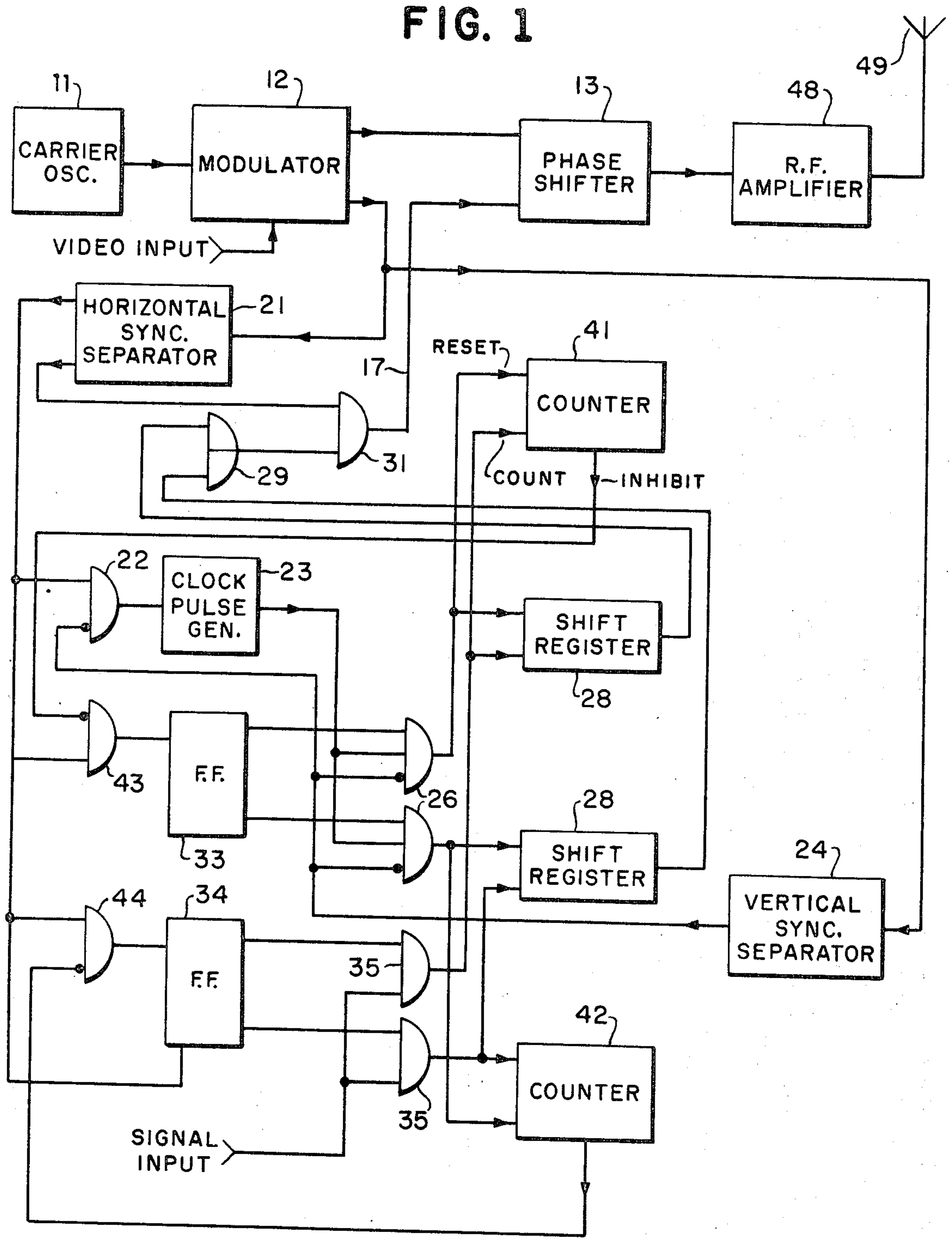
FIG. 1 is a block diagram of a selected one of the possible means for imposing binary coded intelligence information on a television signal transmission.

Referring now to the drawings, there is seen in FIG. 1 an oscillator 11 which provides a radio frequency signal which is fed to the modulator 12, wherein a video input, as from a magnetic recording tape or a television camera, is used to amplitude modulate the radio frequency carrier wave in order to provide a quasi-single sideband emission signal of the usual kind to the phase shifter 13.

Figure 3:
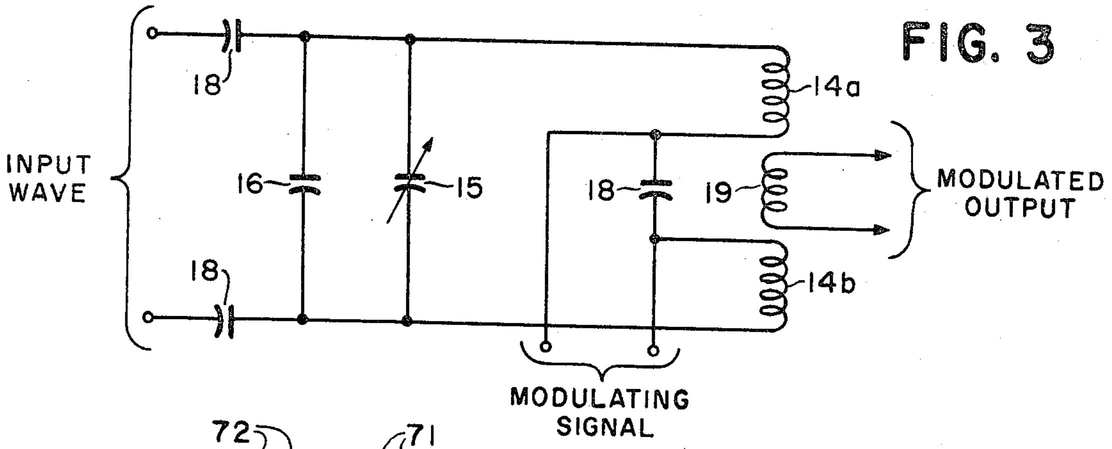
FIG. 3 is an electrical wiring diagram of a modulator for use in connection with the instant invention.

The phase shifter 13 may be of any suitable kind, such as that shown in FIG. 3, wherein a circuit comprising coils 14*a* and 14*b* is shunted primarily by an adjustable capacitor 15 and secondarily by the capacitor 16. Capacitor 16 is a voltage variable capacitor designed to cause the antiresonant frequency of the circuit to fall well above or below the carrier frequency according to the polarizing voltage which is imposed across it through the cable 17. Capacitors 18 serve to isolate the voltage variable capacitor for control purposes and an output coil 19 is employed to extract the phase shifted wave.

A horizontal synchronization pulse separator 21 of the usual kind provides a turn-on signal to the clock pulse generator 23 through the gate 22, in the absence of a vertical synchronization pulse from the vertical synchronization pulse separator 24, and clock pulses thus enter the and gates such as 26, and in the absence of an inhibit signal from the vertical synchronizing signal separator 24, empty the contents of a shift register such as 28 through the or gate 29 and during the continuance of a horizontal synchronizing pulse through the and gate 31 into the cable 17 to operate the phase shifter 13 serially in accordance with the contents of the said shift register. The output of phase shifter 13 is applied to an RF amplifier 48 of well known kind, and thence to a transmitting antenna 49.

The shift register 28 is one of a pair of such devices, each adapted to store the permutation code information encodable upon a single horizontal synchronizing pulse. Thus, the above described readout process takes place through one of the gates 26 only under control of an enabling pulse corresponding to the horizontal synchronizing pulse, terminates with its conclusion, and shifts to the other register 28 upon advent of the next successive horizontal synchronizing pulse. Such shifting and readout occurs alternately for all such pulses until vertical blanking occurs, during which time further action is inhibited as before described, since the waveform at that time is not well suited for the instant purposes.

The aforementioned shifting between the registers 28 is accomplished by a flip-flop 33, having as an input the horizontal synchronizing pulses, so that the registers 28 are discharged alternately on successive pulses. As the readout of each is disabled by the flip-flop 33, a corresponding flip-flop 34 connects the shift register through a gate such as 35 to a signal input, from which serial code bits constituting the modulating information to be applied to the next horizontal synchronizing pulse are loaded into the register.

The operation of the equipment as above described is based on the assumption that the inflow of information occurs synchronously corresponding to the occurrence of pulse transmission. It may of course, occur more slowly, and in that case the transmission is delayed to accommodate it. This is accomplished by locking the flip-flops 33 and 34 during the loading period of each of the registers 28, so that a next succeeding pulse is not modulated if the idle register has not been filled by the time of inception of the said next pulse.

Such locking as above specified may be accomplished by application of an inhibit signal derived from the output of counters 41 and 42 which are operated by count of the input bits to their associated register, and which discontinue the inhibit signal only upon full count and until after being reset by occurrence of readout, said inhibit signal being applied to gates 43 and 44 to block operation of flip-flops 33 and 34 until the idle register is fully loaded.

The information transmission is arbitrarily stopped and started as each field raster is completed so that equalizing pulses may be transmitted and then replaced by vertical blanking and vertical synchronizing signals.

This uneven rate of information flow does not impair the usefulness of the system, however, since the instantaneous information transfer rate is sufficiently high so that an adequate average rate is obtained and the system operates in fact, very much like a time sharing system wherein the intermittency of the transmission of any one participant's information remains undetected because of the high average capabilities of the system.

The means just described are effective to smooth the flow of information to a certain degree, but if full advantage is to be taken of the high information transfer rate potential of the instant system in practical operation, information signals must be stored during the vertical blanking pulse interval when horizontal synchronizing pulses are irregularly spaced and uncertain in number and shape. This is readily accomplished by any of a number of well known arrangements of which storage drums, recycling delay lines, and shift registers are exemplary. The stored information is then read out as needed for application to the synchronizing pulses in the manner described.

Figure 4:
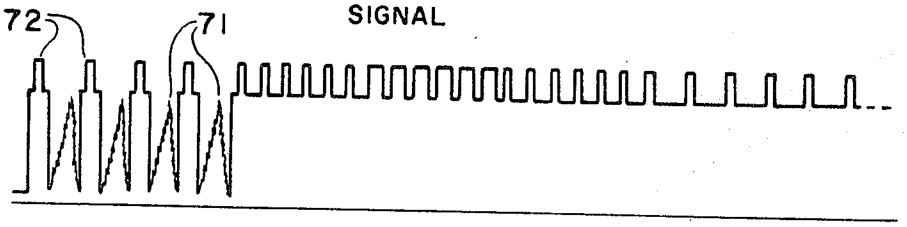
FIG. 4 is a graphical representation of the instantaneous potentials existing on a television video wave.
Figure 5:
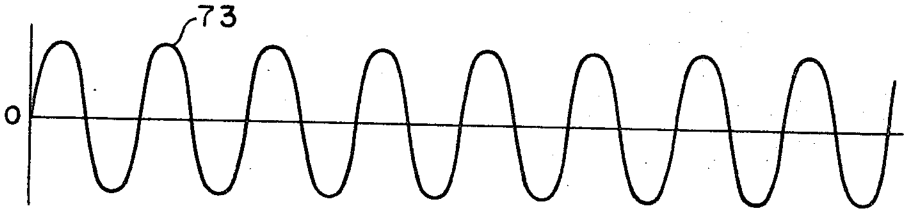
FIG. 5 is a graphical representation of the instantaneous potentials of a portion of a television picture carrier wave.
Figure 6:
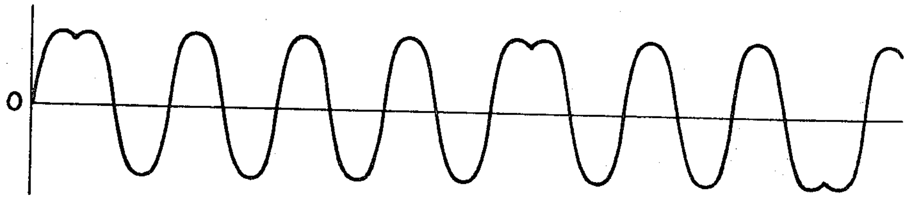
FIG. 6 is a graphical representation of a wave of the kind shown in FIG. 5, when modulated in accordance with the disclosure of the instant invention.
Figure 7:
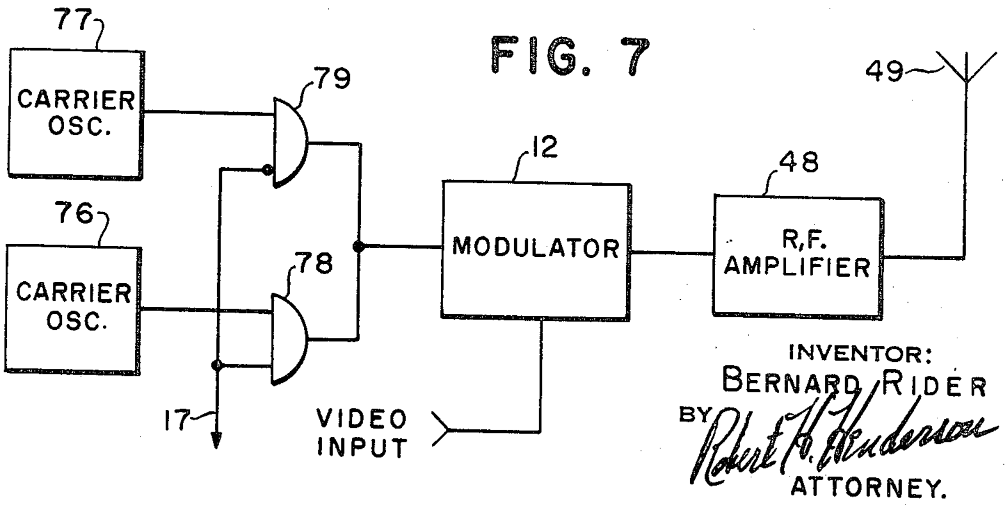
FIG. 7 is a block diagram of a portion of a system frequency shift modulation adapted for use in the instant invention.

As will be evident from the foregoing, the presently preferred method of carrier modulation is by the process of phase modulation. In FIG. 4 there is seen a representation of the standard television video signal as used in the United States. The negatively amplitude modulated line scan is shown at 71 and horizontal synchronization pulses of the kind seen at 52 are present throughout the period during which 525 consecutive line scans 51 are provided. When applied as modulation to an appropriate carrier wave, the pulses 72 upon magnification appear as shown at 73 in FIG. 5. After phase modulation in the described manner, they appear as shown in FIG. 6. It is to be observed that the general appearance of the synchronizing pulse and especially of the entire composite video signal, of which the pulse is only a small part, is substantially unchanged by this type of modulation. As a result of this, the extraneous frequency components required to be injected into the transmitted television wave in order to comprise the inserted information are minimuized both in the number of those having larger amplitudes and in the frequency spread thereof. Frequency modulation also is effective in achieving this purpose, since only two discrete frequencies are required to be encoded on the television transmission for the purposes of this invention. This can be accomplished by the means set forth in FIG. 7, wherein 76 and 77 represent oscillators operating continuously at a relatively small frequency separation with respect to the carriers which they generate, as required for frequency shift keying. Gates 78 and 79 having inputs connected to the outputs of oscillators 56 and 57 respectively also have inputs from the cable 17 of FIG. 1; that to gate 58 providing an enable function and that to gate 59 providing an inhibit function simultaneously with the application of the enable function to the gate 58.

It thus is clear that permutation code pulses applied to the gates 58 and 59 over the cable 17 will be effective to connect one or the other of oscillators 56 or 57 to the modulator 12 according to whether such pulse is present or not, respectively. The freqeuncy modulated output thus provided in the combined outputs of gates 58 and 59 may then be led through a video modulator 12 and a radio frequency amplifier 48 into an antenna 49 as before described in connection with FIG. 1. Other well known forms of modulation, such for example as amplitude modulation may be employed, especially in circumstances where the adverse effects of electrical noise are at a minimum and the bandwith available for the transmission is adequate, such as is the case when coaxial cables are used for inter-city high quality physical circuits. It is particularly to be noted in such, and in similar cases where the amplitude response of the communication channel is well regulated or "flat," and the phase shift essentially linear with respect to frequency and in the substantial absence of interfering noise, that a relaxation of bandwith requirements can be expected, and within a given passband a signal of greater complexity comprising a high information rate can be accommodated than would be expected from the restrictions ordinarily imposed by the well known Nyquist limit.

RECEIVER

The receiver employed in the preferred embodiment of the present invention depends primarily for its unusual advantages upon the utilization of an asychronous or untuned detection device. It is well known in the are that both resonant or tuned circuits and similarly designed electric wave filters have an inherent "flywheel" effect such that they are incapable of responding instantaneously to the advent of signals having the particular frequency to which they are intended to respond, but gradually build up the magnitude of their response over the period of a number of cycles. The more critically they are designed to tune to a particular frequency, as would be necessary as a result of efforts to minimize bandwidth requirements for transmission, the larger and more objectionable does this delay become.

Figure 2:
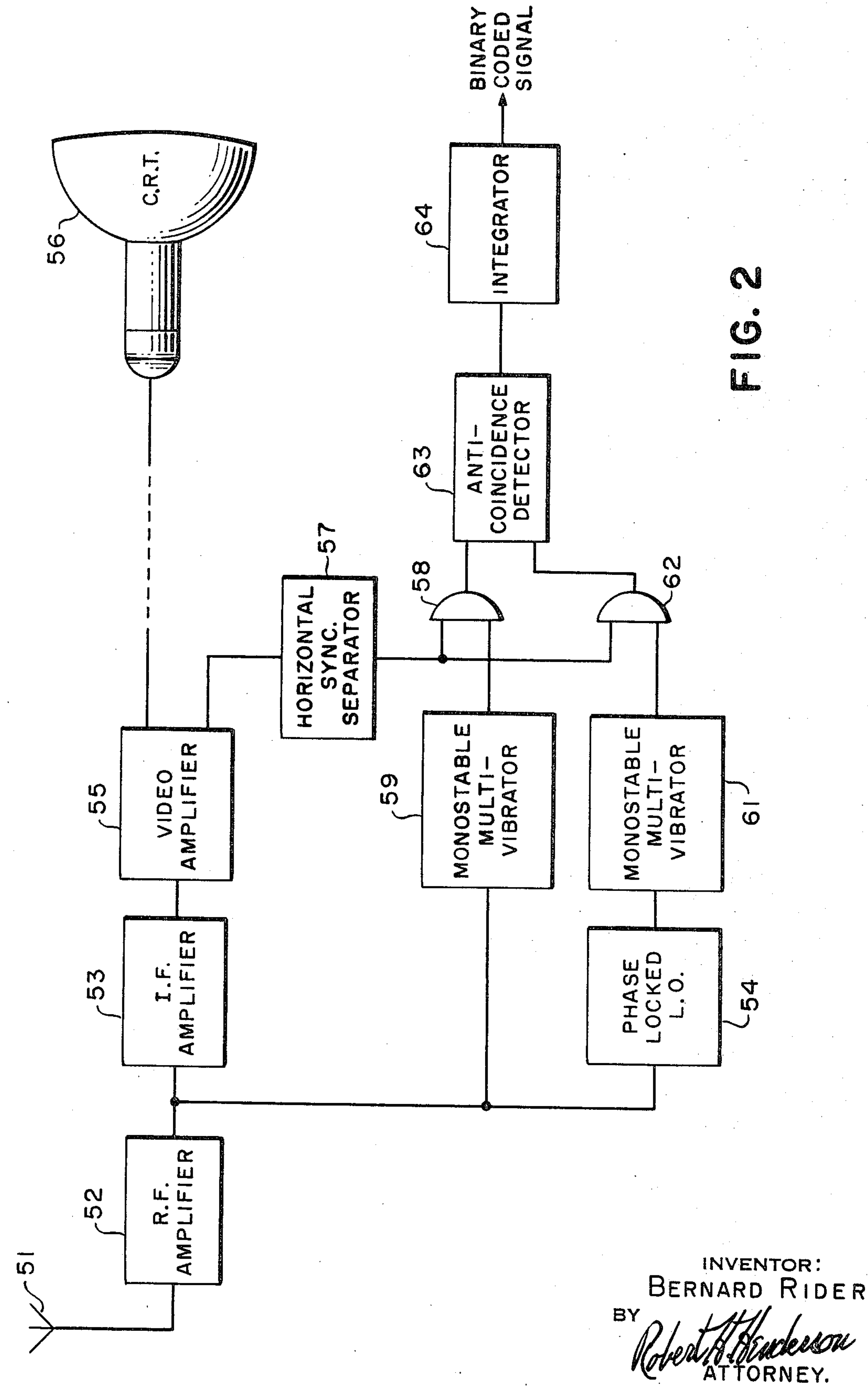
FIG. 2 is a block diagram of means for demodulating a television signal bearing information signals in order to recover its coded information content.

It is for this reason that the receiving arrangeemnt illustrated by the block diagram of FIG. 2 is preferred, although it is to be understood that other systems well known in the art, and particularly other demodulator means, are entirely operative for the purposes of the present invention, and are in fact capable of developing some of its advantages.

Referring then to FIG. 2, there is seen at 51 a radio receiving antenna connected to a radio frequency amplifier assembly 52 from which emerge signal conductors to the conventional intermediate (picture) amplifier assembly as well as the oscillator 54. Oscillator 54 is a local phase-locked oscillator of the usual kind, whereby a local signal is generated which has the same characteristics of frequency and phase rotation as those of the wave received by the antenna 51 under conditions where such received wave characteristics remain constant for a sufficient length of time to allow the oscillator 54 to gradually stabilize itself into coincidence with the said characteristics.

Output from the intermediate frequency (picture) amplifier assembly 53 also passes to the video amplifier 55 and thence to the cathode ray picture tube 56 in the usual manner. Output from the video amplifier 55 is also provided to the horizontal synchronization signal separator 57, which may be the one normally provided in a television receiver or may preferably be a duplicate circuit of the same kind especially adapted to match the impedance of the following circuitry about to be described, in order that optimum performance may be achieved.

Horizontal synchronization signals emerging from the seaparator 57 are led to the end gates 58 and 62, as are rectangular waves produced by the monostable multivibrators 59 and 61 which are driven in synchronism with the incoming television wave and with the local oscillator 54 respectively.

The anticonincidence detector 63 is of the known type which produces no output when its pair of input signals occur simultaneously, but which produces a series of unidirectional output pulses or spikes when the said inputs are displaced in time phase. Such output passes to integrator 64 which converts these repetitive periodic spikes to a mark signal which is continuous for the duration of the said time phase displacement, as required for communications purposes.

This invention has been described in terms of a single specific illustrative example of the preferred method of practicing it, but it is evident that various modifications and elaborations thereof will occur to those who are skilled in the art without however, departing from the essential spirit of the invention, and it therefore is intended that the invention shall be limited only by the appended claims.

What is claimed is:

1. The method of communicating information by the use of a video signal channel utilizing a modulated carrier wave which is carrying at least a video raster signal for producing repetitive video field scans and having a synchronizing pulse for each linear element of each of the said field scans, the said synchronizing pulse consisting of a substantially rectangular voltage wave with respect to time, which comprises:

arranging the said information into a plurality of sequentially ordered and stored groups of simultaneous binary permutation coded bits detecting the advent of each horizontal synchronizing pulse on the television wave and thereupon discharging in order and utilizing each of the stored groups by sequentially employing the bit values thereof to modulate the carrier wave during the period of said synchronizing pulse; so modifying the carrier wave during at least some of the synchronizing pulses transmitting the so modified television wave to a receiving location and demodulating the modulated carrier wave during the periods of the synchronizing pulses at the receiving location to recover a sequence of binary permutation code information signals.

2. The method of transmitting information between a plurality of locations which comprises:

joining the said locations by a communication channel for carrying a modulated carrier wave signal comprising a representation of a visible scene or object and which is characterized by the fact that the said representation signal always contains frequent periods of inactivity during which no video information is being transmitted by the said signal storing the information to be transmitted in successive digital bit permutation code sequences of predetermined extent detecting the occurrence of a said period of inactivity of the said signal diverting and modulating the said carrier wave with a said stored information sequence only during at least some of the said periods of inactivity and transmitting the so modulated signal in the said communication channel.

3. The method of communicating information by the use of a video signal channel which is carrying at least a video raster signal for producing repetitive video field scans and having a synchronizing pulse for each linear element of each of the said field scans, the said synchronizing pulse consisting of a substantially rectangular voltage wave with respect to time, which comprises:

converting the information into a succession of sequences of binary permutation coded bits storing each sequence until the occurrence of a synchronizing pulse on the video signal and then modulating the carrier wave serially during the periods of the synchronizing pulses with the stored information of the sequence transmitting the so modulated video signal to a receiving location and demodulating the carrier wave during the periods of the synchronizing pulses to recover the transmitted information.

4. The method of communicating information by the use of a video signal channel which is carrying at least a video raster signal in the form of a modulated carrier wave for producing repetitive video field scans and having a synchronizing pulse for each linear element of each of the said field scans, the said synchronizing pulse consisting of a substantially rectangular voltage wave with respect to time, which comprises:

arranging said information in a series of permutation coded bits and varying the instantaneous magnitude of the carrier wave during the period of said synchronizing pulses in accordance with said coded bits and transmitting the so varied signal.

5. The method of transmitting information by the use of a modulated carrier wave television signal having a synchronizing pulse for each linear element thereof, the said synchronizing pulse consisting of a substantially rectangular voltage wave with respect to time, which comprises:

converting the said information into a series of binary permutation coded signals placing a predetermined number of said coded signals in memory storage detecting the occurrence of the start of a said synchronizing pulse phase modulating the carrier wave during only the synchronizing pulse periods of the television signal with the sequential discharge of said coded signals from memory storage and transmitting the so modulated television signal.

6. The method of transmitting information by the use of a television signal having a synchronizing pulse for each linear element thereof, the said synchronizing pulse consisting of a substantially rectangular voltage wave with respect to time, which comprises:

converting the said information into a series of binary permutation coded signals placing a predetermined number of said coded signals in memory storage detecting the occurrence of the start of a said synchronizing pulse frequency modulating the carrier wave during only the synchronizing pulse of the television signal with the sequential discharge of said coded signals from memory storage and transmitting the so modulated television signal.

7. A method of transmitting information by the use of a television signal having a synchronizing pulse for each linear element thereof, the said synchronizing pulse consisting of a substantially rectangular voltage with respect to time, which comprises:

converting the said information into a series of binary permutation coded signals placing a predetermined number of said coded signals in memory storage detecting the occurrence of the start of a said synchronizing pulse angle modulating the carrier wave only during the synchronizing pulse of the television signal with the sequential discharge of said coded signals from memory storage and transmitting the so modulated television signal.

References Cited

UNITED STATES PATENTS 2,401,384 6/1946 Young ------------- 178—5.6

ROBERT L. GRIFFIN, Primary Examiner

J. C. MARTIN, Assistant Examiner